*INVENTOR.*
MARK S. ZIMMERMAN
*BY* Jacob Trachtman
ATTORNEY

PULSE POSITION MODULATION SWEEP INTEGRATOR SYSTEM

Filed Sept. 22, 1960 2 Sheets-Sheet 2

*INVENTOR.*
MARK S. ZIMMERMAN

*BY* Jacob Trachtman

ATTORNEY

United States Patent Office 3,274,497

Patented Sept. 20, 1966

3,274,497

PULSE POSITION MODULATION SWEEP INTEGRATOR SYSTEM

Mark S. Zimmerman, Philadelphia, Pa., assignor to General Atronics Corporation, Montgomery County, Pa., a corporation of Pennsylvania Filed Sept. 22, 1960, Ser. No. 57,838

15 Claims. (Cl. 328—37)

Figure 1:
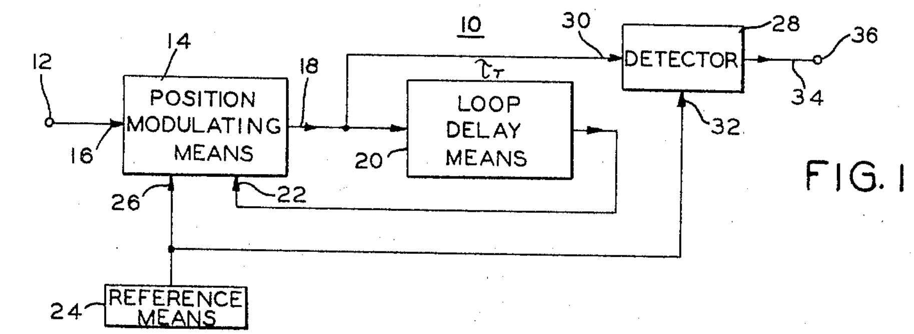

The invention relates to signal integrating means and method, and more particularly to signal integrating means and method of the sweep integrating type.

Heretofore, devices for performing integration of periodically occurring or repetitive signals have been provided by comb filters and sweep integrators using amplitude, frequency and phase modulation of carriers. Such prior art devices have had the disadvantage of requiring distortionless amplifiers in order to prevent degradation or loss of information. Since all amplifiers have some distortion, such prior art integrators have been limited in the number of circulations over which information could be stored. Such prior art devices are complex in operation and require correspondingly complex circuitry for satisfactory operation.

It is therefore a primary object of the invention to provide a signal integrating means and method which can accurately retain information over long periods of time.

Another object of the invention is to provide a signal integrating means and method which utilizes simplified techniques and apparatus for achieving long memory and efficient operation.

Another object of the invention is to provide a new and improved signal integrating means which is comparatively inexpensive to manufacture and maintain in operation.

Another object of the invention is to provide a signal integrating means and method utilizing time modulating techniques for circulating signals to achieve simplification of apparatus and efficiency of operation.

The objects of the invention are achieved by providing a signal integrating means comprising a signal loop including an adder circuit having a first input lead for receiving information signals, a second input lead and an output lead, and a pulse generator circuit receiving signals from the output lead of the adder circuit and delivering an output signal when its input signal exceeds a predetermined threshold value. A delay line is provided having an input lead receiving the output signals from the pulse generator circuit and an output lead delivering signals to the second input lead of the adder circuit.

A reference oscillating circuit delivers signals to the adder circuit for providing reference time-positions for signals circulating in the loop and biasing said signals toward their respective reference time-positions.

The integrating means also includes a signal detector circuit having input leads receiving respective signals from said pulse generator circuit and said oscillator circuit and delivering output signals responsive to the time-positions of respective ones of said circulating signals with respect to their reference time-positions.

A pulse inserting network detects the signals circulating in said signal loop and delivers a pulse to the signal loop to provide a circulating signal with respect to each of said reference time-positions. The pulse inserting network includes a fault detector unit receiving signals from the said pulse generator circuit and delivering an output signal in the absence of a signal from the pulse generator circuit with respect to a reference time-position. A pulse inserting generator unit delivers a pulse to said signal loop for providing a circulating signal with respect to each of said reference time-positions upon receipt of an output signal from said fault detector unit.

The method of the invention for integrating signals comprises circulating a plurality of signals in a signal loop, periodically changing the positions of said signals responsive to an information signal, and detecting the time-positions of said signals in said loop for providing respective output signals. The method also includes the step of providing each of said circulating signals with a respective reference time-position, and the step of detecting the time-positions of said signals with respect to their respective reference time-positions for providing respective output signals.

Figure 2:
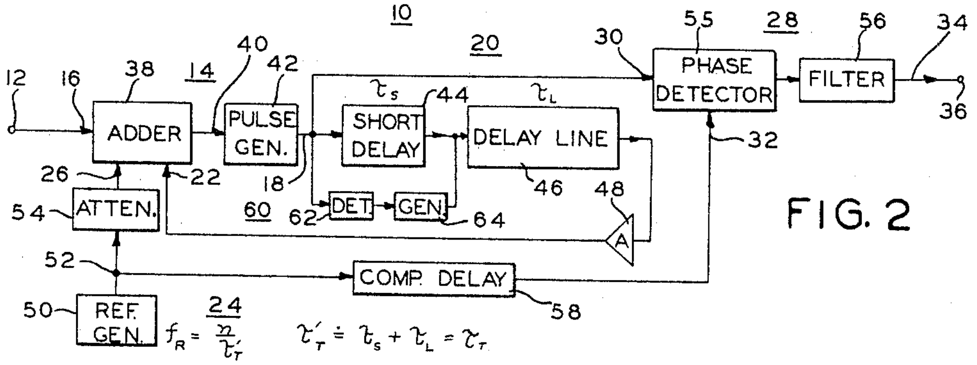
Figure 3:
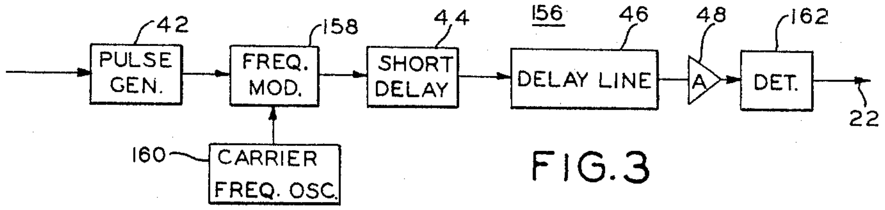
Figures 5A, 5B, 5C, 5D:
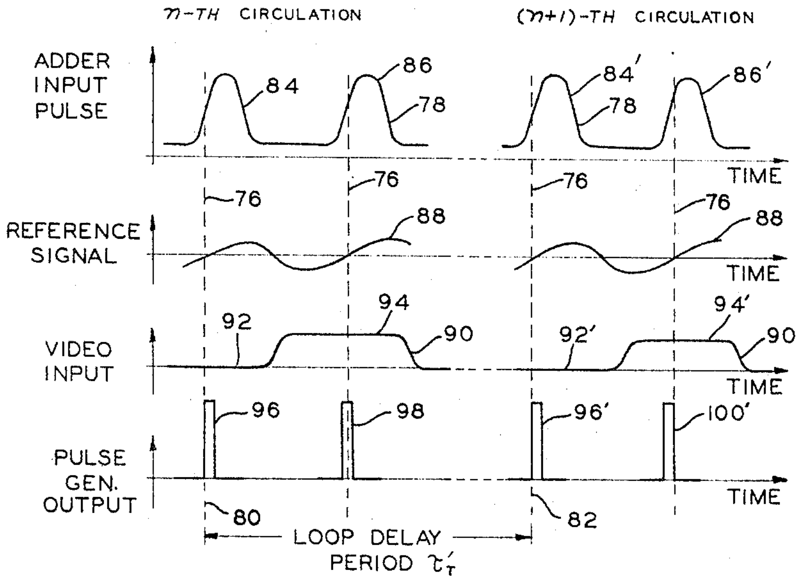
Figure 6:
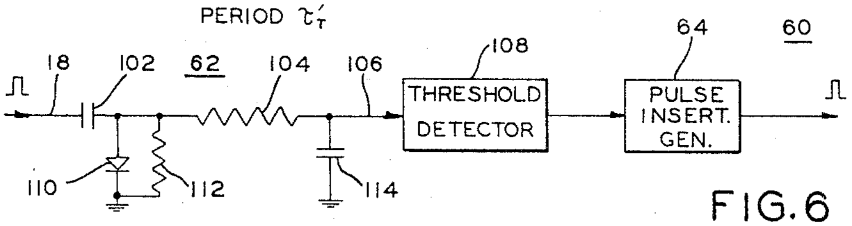

The foregoing and other objects of the invention will become more apparent as the following description of the invention is read in conjunction with the drawings, in which:

FIGURE 1 diagrammatically illustrates in block form a signal integrating means embodying the invention, FIGURE 2 diagrammatically illustrates in block form and in greater detail the integrating means of FIGURE 1, FIGURE 3 diagrammatically illustrates a modified form of a portion of the signal integrating means shown in FIGURE 2, FIGURE 4 is a graphic representation illustrating the modulating effect of the video or information input signal upon the circulating signals in the loop of the signal integrating means, FIGURE 5 is a graphic representation illustrating the cumulative integrating effect of a video signal upon circulating signals of the integrating means, FIGURE 6 diagrammatically illustrates in greater detail the pulse inserting network of FIGURE 2, and FIGURE 7 is a graphic representation illustrating the operation of the pulse inserting network of FIGURE 6.

Like reference numerals designate like parts throughout the several views.

FIGURE 1 diagrammatically illustrates in block form a signal integrating means 10 embodying the invention.

The signal integrating means 10 is provided with an information input terminal 12 which delivers modulating signals to a signal affecting or position modulating means 14 at its input 16. The output 18 of the modulating means 14 delivers signals to a signal connecting or loop delay means 20. Signals received by the loop delay means 20 from the output 18 of the modulating means 14 are redelivered at the signal input 22 of the modulating means 14 after a predetermined delay time $\tau_T$.

The modulating means 14 also receives signals from a reference means 24 at its input 26.

An output means or signal detector 28 receives signals from the output 18 of the modulating means 14 at its input 30, and signals from the reference means 24 at its second input 32, while delivering output signals over the line 34 to the output terminal 36.

In operation, the position modulating means 14 and the loop delay means 20 form a loop, circulating signals which have their positions modulated responsive to the video or information signal delivered to the input terminal 12. The reference means 24 also delivers a signal to the position modulating means 14 for establishing reference time-positions with respect to which the circulating signals are positioned. The detector 28 also receives reference signals from the reference means 24, while sensing signals circulating in the loop for delivering output signals responsive to the position of the circulating signals with respect to the reference time-positions at the output terminal 36.

FIGURE 2 diagrammatically illustrates in block form and in greater detail the signal integrating means 10 of FIGURE 1.

The information signal on terminal 12 is delivered to an adder circuit 38 which with a pulse generator 42 comprises the position modulating means 14. The output signal from the circuit 38 is delivered to the generator 42 which provides an output pulse. The output pulse from the generator 42 is delivered to the input of a short delay line 44 which delivers signals after a delay $\tau_S$ to the main delay line 46. After a delay $\tau_L$ the delay line 46 delivers the signal to the input 22 of the adder 38 after amplification by the amplifier 48.

Figures 7A, 7B, 7C, 7D:
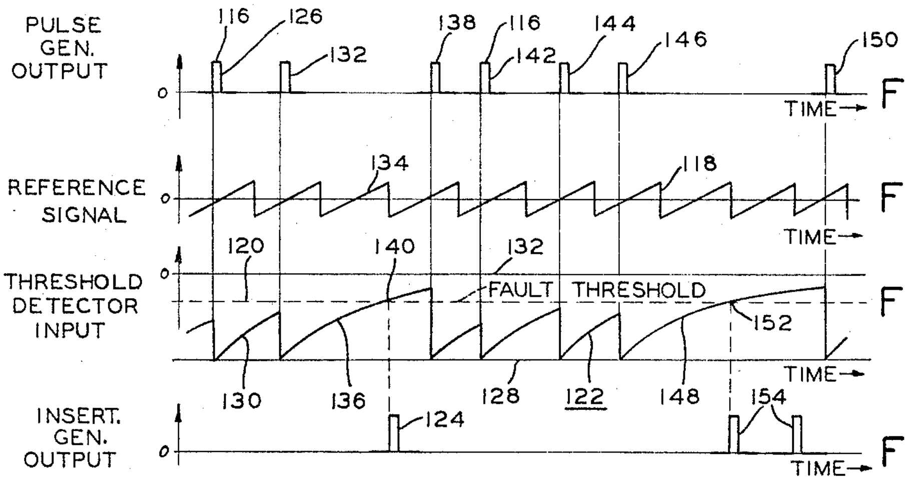

The reference means 24 comprises a reference generator 50 which may deliver sine wave signals as shown in FIGURE 5*b* or saw tooth signals as illustrated in FIGURE 7*b*. The signals at the output 52 of the generator 50 are delivered through an attenuator 54 to the input 26 of the adder 38.

The detector 28 comprises a phase detector 55 and a filter network 56. The phase detector 55 receives at its input 30 signals from the output 18 of the pulse generator 42 as well as receiving signals at its input 32 from the output 52 of the reference generator 50 through a compensating delay line 58. The phase detector 55 delivers output signals to filter network 56 which provides an output signal over the line 34 to the terminal 36.

The loop delay means 20 is also provided with a pulse inserting network 60 comprising a fault detector unit 62 and a pulse inserting generator unit 64. The fault detecting unit 62 receives signals delivered at the output 18 by the pulse generator 42 and delivers an output signal to the pulse inserting generator unit 64 in the absence of a signal from the pulse generator 42 with respect to a reference time-position. The pulse inserting generator unit 64 delivers a pulse to the input of the delay line 46 of the loop delay means 20 for providing a circulating signal with respect to said reference time-position upon receipt of an output signal from the detecting unit 62.

In operation, the information signal 12 delivered to the input 16 of the adder 38 is combined with the circulating signal pulse received on the input 22 and the reference signal from the reference generator 50 delivered to its input 26. The adder circuit 38 may be any conventional adder which combines the amplitudes of the input signals and delivers an output signal with a corresponding combined amplitude. This signal is delivered to the input 40 of the pulse generator 42 which may be a conventional monostable circuit which delivers a signal at its output 18 when the amplitude of the signal to its input 40 exceeds a predetermined value. Such pulse generators are illustrated in Massachusetts Institute of Technology Radiation Laboratory Series, volume 19, chapter 9, entitled "Waveforms," published by McGraw-Hill, 1949.

Figures 4A, 4B, 4C, 4D:
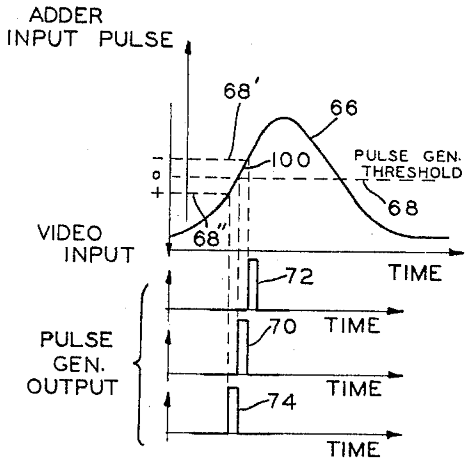

FIGURE 4 illustrates the effect of the information signal upon the delivery of an output signal by the pulse generator 42. The curve 66 in FIGURE 4*a* is the form of the pulse from the generator 42 after it has passed through the loop delay means 20 and has been returned to the input 22 of the adder 38. The line 68 is the threshold level of the pulse generator 42 for delivering an output pulse 70 shown in FIGURE 4*c* when the video or information signal on terminal 12 has a zero amplitude. As seen from FIGURE 4*a*, the effective threshold 68' of the pulse generator 42 in the presence of a negative information signal on terminal 12 results in output pulse 72 shown in FIGURE 4*b*, while a positive information signal provides the effective threshold level 68'' resulting in the output pulse 74 shown in FIGURE 4*d*. It is noted that the absolute value of the threshold for the pulse generator 42 does not vary, although the illustrated levels in FIGURE 4*b* differ for purposes of the graphical illustration.

For example, addition of positive and negative information signals to the pulse signal shown at 66 effectively respectively raises and lowers the pulse 66 resulting in the delivery of a signal attaining the threshold value level 68 of the pulse generator 42 at earlier and later times. This effect is illustrated by the FIGURES 4*b*, 4*c* and 4*d*, wherein the delivery of a positive information signal to the terminal 12 results in the delivery of an output pulse 74 which is advanced over the delivery of the output pulse

70 which is delivered in the absence of such a signal, while the presence of a negative signal at the terminal 12 results in the delivery of an output signal by the pulse generator 42 which is delayed with respect to the pulse signal 70.

Thus, the amplitude of the information signal modulates the position of the signals circulating in the loop.

A reference signal such as the sine wave signal shown in FIGURE 5*b* is delivered to the adder 38 at its input 26 for the purpose of providing reference time-positions and a degenerative or biasing means for the circulating signals. The frequency $f_R$ of the reference signal may be equal to a multiple "*n*" of the reciprocal of the total delay $\tau'_T$ of the loop delay means 20 and modulating means 14, where "*n*" is an integer. The total delay $\tau'_T$ is essentially equal to the delay $\tau_T$, the sum of the delays $\tau_S$ and $\tau_L$ of the short delay line 44 and the main delay line 46. This provides a given number "*n*" reference time-positions for the circulating signals of the loop. One pulse signal is provided for each pulse reference time-position.

In FIGURE 5 each reference time-position is shown by the vertical dashed lines 76 positioned where the rising reference signal 88 of FIGURE 5*b* crosses its zero amplitude value. The reference time-positions are each provided with a pulse 78 positioned with respect thereto as shown in FIGURE 5*a*. Thus, "*n*" circulating pulse signals 78 are present within the loop delay period $\tau'_T$ illustrated between the vertical lines 80 and 82.

Two consecutive pulses 84, 86 are illustrated in FIGURE 5*a* with a corresponding portion of the reference signal 88 in FIGURE 5*b*, and information or video input signal 90 of FIGURE 5*c*. The signal 90 has a zero amplitude at 92 during the occurrence of the first pulse 84 and a substantially constant positive amplitude 94 during the occurrence of the second pulse 86.

In the absence of an information signal 90, it is noted that the reference signal 88 has the effect of increasing the amplitude of a signal occurring after the reference time-position 76, while decreasing the composite signal delivered by the adder occurring just before the reference time-position 76. Since as seen from FIGURE 4, increase in the positive amplitude of the video signal to the adder advances the pulse signal delivered by the pulse generator 22, and its decrease delays the delivery of the output pulse from the generator 42, the reference signal 88 degenerates or biases the position of the circulating pulses 78 towards their respective reference time-positions 76. The absence of an input signal to the terminal 12 over a prolonged time will result in the positioning of the circulating pulses 78 at their respective zero reference time-positions.

Thus, the reference signal 88 acts to degenerate or bias the positions of circulating signals 78 towards assuming their respective zero or reference time-positions illustrated by the position of pulse 96 of FIGURE 5*d*. The amplitude of the reference signal 88 delivered to the adder 38 may be controlled by the variable attenuator 54, thereby increasing or decreasing the degenerative or biasing effect upon the circulating signals 78. Thus, if the amplitude of the reference signal delivered to the adder 38 is increased, a circulating signal in the absence of an information signal will be caused to assume its zero reference position more quickly. In the presence of an information signal, an increase in the amplitude of the reference signal 88 will also tend to decrease the displacing effect of the information signal with respect to the zero or reference time-position. The effect of this also is to decrease the memory of the device or the time period over which information is stored by the circulating signals.

By decreasing the amplitude of the reference signal 88 delivered to the adder 38, the memory of the device or the information retained in the circulating signals is retained over a longer period of time. This is because the reference signal has a smaller effect tending to degenerate the information in the circulating signals by causing them to be biased towards the reference positions. Similarly, in the presence of a reduced reference signal, the information signal has a greater effectiveness in displacing the circulating signals. In this connection, it is noted that the biasing or reference signal must have sufficient amplitude to prevent displacement of the circulating signals from the region of their respective reference time-positions to that of any of the other reference time-positions when modulated by the maximum permissible amplitude of the information signal delivered to the terminal 12.

FIGURE *5d* illustrates the cumulative effect produced upon the reoccurring circulating signals 84 and 86 of FIGURE *5a*, by the presence of the information signal shown in FIGURE *5c*. It is noted that the circulating pulse 84 results in the production of the output pulse 96 in the zero or reference time-position beginning on the dashed line 76, in the presence of a zero input information signal 92. After one loop delay period, the pulse 84' appears at the adder input in the presence of a zero input signal 92' which again results in an output pulse 96' from the pulse generator 42 which remains in the zero position. Thus, in the presence of a zero amplitude information signal, the pulse delivered by the generator 42 remains in the zero reference position. This is assured by the reference signal 88 which also provides a bias or causes displacement of the circulating signals towards the zero reference position.

The circulating signal 86 which appears subsequent to the signal 84 is also identically positioned with respect to its zero reference time-position illustrated by the dashed lines 76 for producing an output signal by the pulse generator 42 in the zero position in the presence of a zero information signal 90. However, in this case, the input signal 90 is provided with a positive value at 94 which results in the production of an output pulse 98 which is advanced or displaced in position to the left of the zero reference position. This is in accordance with the effect of such a positive information signal described in connection with FIGURE 4.

After one loop delay period the pulse 98 is delivered to the input of the adder 38 as graphically illustrated in FIGURE *5a* as signal 86'. The signal 86' is received by the adder after a time which is less than the loop delay period $\tau'_T$ beginning with the receipt of the preceding signal 86 by the adder 38. This, of course, is due to the advancing effect of the positive information signal 94 upon the output signal 98 causing it to occur at an earlier time which precedes the zero or reference position. In the absence of an information signal on the terminal 12, the pulse 86' would produce an output pulse at the pulse generator 42 which would be closer to the zero reference position shown by the dashed lines 76 than the pulse 98 of the preceding period. This is because of the degenerative effect of the reference signal 88.

However, as illustrated in FIGURE *5c*, a positive information signal is again present at 94' which results in the production of an output signal 100', by the pulse generator 42 which is further advanced or positioned to the left of the reference position 76. Should the information signal 90 have a positive portion 94 of substantially the same value concurring with the pulse 86 during each cycle, then the output pulse provided by the pulse generator 42 would continue to advance to the left until the biasing effect of the reference signal 88 is equal to the advancing effect of the information signal 90. At this point the signal delivered by the pulse generator 42 will maintain a stable displaced position corresponding to the value of the amplitude of the information signal occurring at that time. From this effect it is noted that the position of the output pulse of the pulse generator 42 with respect to an average input signal depends upon the amplitude of the reference signal 88 delivered to the adder 38.

As the amplitude of the reference signal 88 is decreased, its degenerative effect is also increased which results in decreasing the displacement of the output pulse for a given average input signal. Of course, the displacement of the output pulse for an average negative information signal will result in a position to the right of the reference position 76.

For relatively small displacements of the output pulse signals about the reference position and with the utilization of a reference signal of low amplitude, the biasing effect produced by the reference signal 88 may be considered substantially proportional to the displacement from the reference time-position. A saw tooth wave signal such as shown in FIGURE *7b* may be utilized having linear positive slopes for assuring the proportionality of displacement of the output pulse from the generator 42 with respect to average input information signals.

Since the threshold level of the pulse generator 42 may be adjusted to the relatively linear portion 100 of the curve 66 shown in FIGURE *4a*, the resulting displacement by advancing or retarding the output pulse signals, such as signals 70, 72, 74 of FIGURE 4 corresponding to zero and negative or positive input signals, results in a proportional incremental displacement with the variations of the information input signal within prescribed limits.

Thus, each information signal 90 occurring during the receipt by the adder of a circulating signal 76 has an effect which is linear and directly proportional to the amplitude of the information signal and is added to the effect of previous such signals 90 to provide an output pulse to the pulse generator representing the integration of such periodically received information signals. Of course, the reference signal 88 which provides the biasing effect, degenerates the information accumulated by the circulated pulse over numerous circulations.

Thus, from the description of the operation of the signal integrating means 10, it is evident that the position modulating means 14 comprising the adder 38 and pulse generator 42 operate as a variable delay means for increasing or decreasing the total effective delay of a circulating pulse, thereby either advancing or retarding the positions of the circulating signals with respect to their reference time-position responsive to the receipt of positive or negative information signals at the terminal 12. In the presence of a zero amplitude signal to the terminal 12, the circulating signals are not affected except by the degenerating effect of the reference signal 88 to the adder 38. This means that if no reference generator signal 88 or information signal 90 is delivered to the adder 38, the circulating signals would all retain their positions relative to each other and would circulate indefinitely without loss of information embodied in their relative positions.

The delay lines 44 and 46 may be of the high quality, conventional type including quartz crystal delay lines. The delay lines may also be magnetostrictive delay lines for handling positive and negative going pulse signals.

The phase detector 55 may be of the type described in Electronic Designers Handbook by Robert W. Landee, Donavan C. Davis and Albert C. Albrecht, published 1959 by McGraw-Hill Book Company, Inc. On page 5–44 of the handbook, FIGURE 5.45 discloses a method of demodulating position-modulated pulses wherein each position-modulated pulse is detected with respect to a reference pulse. Of course, any other known means for detecting position-modulated signals may also be utilized.

The compensating delay line 58 through which the reference signals 88 from the generator 50 are delivered to the detector 55 adjusts for the delay which may result from the passing of the reference signal and circulating signal through the adder 38, and the operation of the pulse generator 42 before the delivery of the output pulse by the generator 42 to its output 18, as well as providing for an adjustment of the zero output signal delivered to the output terminal 36.

The filter network 56 is provided for smoothing the input signals and rejecting signals having the frequency of the reference signal and harmonics thereof. The output signals delivered to the output terminal 36 have amplitudes which correspond to the integrated information contained in the circulating signals of the integrating means 10. The amplifier 48 in the loop delay means 20 amplifies the signals from the delay line 46 which are delivered to the adder 38 to the extent required to provide an amplitude of the position modulated pulse at the input 40 to the pulse generator 42 which will cause the threshold 68 of the pulse generator 42 to be reached during the approximately linear rise of the adder input pulse 66, as shown in FIGURE 4*a*. The signals circulating are delivered to the adder 38 with an amplitude which will result in a minimum change of their positions with respect to their reference time-positions in the absence of signals to the input 16 and 26 of the adder 38.

The pulse inserting network 60 initiates the operation of the signal integrating means 10 by positioning pulses with respect to each of the reference time-positions and also replaces pulses which may be lost or otherwise destroyed during the operation of the means 10. FIGURE 6 shows in greater detail the fault detecting unit 62 and pulse inserting generator unit 64 which may be utilized for this purpose.

Positive going pulse signals delivered to the output 18 of the pulse generator circuit 42 are delivered through a coupling capacitor 102 and resistor 104 to the input 106 of the threshold detector 108 of the fault detecting unit 62. The junction of the capacitor 102 and resistor 104 is returned to ground potential through a resistor 112 and is connected to the anode of a diode 110 which has its cathode connected to ground potential. The input 106 of the threshold detector 108 is also returned to ground potential by the capacitor 114.

Upon the receipt of a positive pulse, the capacitor 102 is charged by current passing to ground through the diode 110 which has a much lower forward resistance than the resistance of the resistor 112. When the positive pulse is no longer present, the capacitor 102 discharges its current through the resistor 112 which has a resistance which is much lower than the back resistance of the diode 110. Thus, the time constant provided by the capacitance of the capacitor 102 and the forward resistance of the diode 110 is much smaller than the time constant of the capacitance of the capacitor 102 and the resistance of the resistor 112, providing for fast charging of the capacitor 102 and its slow discharge. The time constant for discharging the capacitor 102 is made equal to substantially the period of the reference signal from the generator 50 so that the capacitor 102 is almost discharged after the occurrence of one period of the reference signal without the occurrence of a positive pulse on the output line 18 from the pulse generator 42. The resistor 104 and capacitor 114 act as a filter network for substantially smoothing the signals delivered to the input terminal 106 of the threshold detector 108.

The threshold detector 108 may be a blocking oscillator of general design which is biased beyond cut-off and delivers an output pulse to the pulse inserting generator unit 64 only upon receipt of a signal to its input terminal 106 above a predetermined threshold value. Such a blocking oscillator is described in said Massachusetts Institute of Technology Radiation Laboratory Series cited above. Upon the receipt of a signal by the generator unit 64 at its input, the generator unit 64 delivers a positive going output signal to the input of the main delay line 46. The generator unit 64 may be a monostable circuit of design similar to the pulse generator circuit 42.

Refer to FIGURE 7 for a description in greater detail of the operation of the pulse inserting network 60 of FIGURE 6. The pulse signals 116 generated by the pulse generator 42 are shown in FIGURE 7*a*, while their positions with respect to the saw tooth reference signal 118 is illustrated by FIGURE 7*b*. The dashed horizontal line 120 illustrates the threshold level of the detector 108 for providing an output signal to the generator unit 64, while the line 122 shows the time variation of the input signal on the line 106 of the threshold detector 108. FIGURE 7*d* shows the positive output pulse signal 124 delivered by the pulse inserting generator unit 64.

Upon the occurrence of the first positive output signal 126 from the generator 42, the input signal to the threshold detector 108 is driven to its maximum negative level illustrated by the horizontal line 128 and increases exponentially at 130 until the occurrence of the next positive going signal 132 from the generator 42. The signal on the input 106 of the threshold detector 108 again increases exponentially toward the horizontal line 132 of zero amplitude. Since a pulse from the generator is not delivered during the time-position interval represented by the positive sloped portion 134 of the reference signal 118 (FIGURE 7*b*), the signal continues to rise as shown at 136 until the occurrence of the next signal 138 from the generator 42 which returns the signal 122 to its maximum negative value at 128. However, since an output signal was not delivered by the generator during the reference signal interval, the input signal to the detector 108 during its rise interval 136 exceeded at 140, the threshold value 120 of the detector 108. This effects the delivery of a signal by the threshold detector 108 causing delivery of a positive output pulse 124 by the pulse inserting generator unit 64. Although the pulse 124 is generated after its reference time interval 134 in FIGURE 7*d*, this pulse is inserted after the short delay line 44, thereby advancing it in position so that it is placed within its reference time-position. Of course, since the inserted pulse is positioned within the proper time interval, it will assume its appropriate position after sufficient circulations, due to the biasing effect of the reference signal and the modulation of the inserted pulse by the information signal delivered to the input terminal 12.

The different positions of the following pulses 142, 144 and 146 of FIGURE 7*a* illustrate the various pulse positions of these signals which result in the return of the signal 122 of FIGURE 7*c* to its maximum negative value 128 after longer or shorter exponential rises of the signal 122 depending upon the spacing of the pulses from the generator 42. However, since there is a pulse within each of the reference time intervals 134, the signal 122 is not permitted to exceed the threshold value 120 of the detector 108. When after the occurrence of the generator pulse 146, several generator pulses are absent, the signal 122 is caused to continuously rise as shown at 148 until the occurrence of the pulse 150 from generator 42. After the signal 122 exceeds the threshold value at 152, the threshold detector 108, which as previously stated may be a blocking oscillator, provides output signals to the pulse inserting generator unit 64 at a rate equal to the frequency $f_R$ of the reference generator 50. This results in the delivery of output pulses 154 at the proper rate to provide each of the reference time intervals with a respective circulating pulse.

Thus, when operation of the signal integrating means is first initiated and there are no circulating signals in the integrating means 10, the threshold detector 108 is conditioned to provide signals at the reference frequency, which operates to deliver pulses from the pulse inserting generator unit 64 at the proper rate to supply a pulse for each of the reference signal intervals. When the first of such circulated inserted pulses is then received by the pulse generator 42 it provides an output signal to the line 18. The occurrence of this signal reduces the signal to the detector unit 108 of the pulse inserting network 60 to its maximum negative value which terminates the insertion of pulse signals and prevents delivery of extraneous circulating signals. Also, since the fault detector unit 62 of the network 60 constantly receives signals and monitors the pulses delivered by the pulse generator 42, a new pulse is inserted to replace any pulse which may be lost or destroyed by the operation of the signal integrating means 10.

Refer now to FIGURE 3 which is a diagrammatic representation in block form of a portion of a signal integrating means 156 which is a modified form of the signal integrating means 10 of FIGURE 2.

The signal integrating means 10 may be modified for circulating signals through the delay lines 44 and 46 which are provided with a carrier signal. To achieve this, the signal from the pulse generator 42 is delivered to a frequency modulator 158 (FIGURE 3) which also receives a signal from a carrier frequency oscillator 160 with a selected carrier frequency. The signal from the modulator 158 may then be delivered through the delay lines 44 and 46 and amplified by the amplifier 48. The signal from the amplifier 48 is then detected by the envelope detector 162 which delivers its output signal to the input 22 of the adder 38 (see FIGURE 2). By modulating a carrier signal by the pulse signals, a signal is provided with a carrier frequency which may be chosen to provide the most efficient utilization of the delay lines 44 and 46.

Of course, the signal integrating means may be adapted for using an amplitude, frequency or phase modulated circulating signal which is successively affected by its position modulating means for achieving the advantages of the invention.

While the invention has been described and illustrated with reference to several specific embodiments, it is to be understood that the invention is capable of various modifications and applications, not departing essentially from the spirit thereof, which will become apparent to those skilled in the art.

What is claimed is:

1. A system for sweep integrating signals subject to occurrence with variable amplitudes at predetermined time-positions within a given period said system comprising: a closed signal loop providing for signals circulating around said loop a time delay substantially equal to said period, means for injecting into said loop signals for circulation around said loop; and means for varying the time-positions of different ones of said injected signals in accordance with the variations in amplitudes of different ones of said variable amplitude signals.

2. The system of claim 1 characterized in that said injecting means comprises a pulse generator means productive of pulses of substantially fixed amplitude.

3. The system of claim 2 characterized in that said pulse generator means is responsive to each said variable amplitude signal to produce a pulse signal at a time-position subject to departures from a reference time-position in accordance with said amplitude variations.

4. The system of claim 3 further comprising means for producing a reference signal having a substantially unvarying relationship to said reference time-position.

5. The system of claim 4 further comprising means for combining with said variable amplitude signal a signal of amplitude determined independently of said variable amplitude signal and occurring at said predetermined time-positions, and means for applying said combined signal to said pulse generator means.

6. A signal integrating means comprises a signal loop including signal position modulating means for varying the effective loop delay responsive to an information signal, an input terminal for delivering an information signal to the modulating means of said loop for varying the time-positions within a predetermined time interval of signals circulating in said loop, and means for providing respective reference time-positions determined independently of said varying time-positions for said signals circulating in said loop.

7. The means of claim 6 in which said referencing means delivers a signal to said modulating means for biasing said circulating signals toward their said respective reference time-positions.

8. The means of claim 7 including means for detecting the time-positions of said circulating signals with respect to their said reference time-positions.

9. The means of claim 7 in which said referencing means provides a predetermined number of said reference time-positions within said time interval, and includes means for providing a signal circulating in said loop for each of said reference time-positions.

10. A signal integrating means comprising a signal loop including an adder circuit having a first input lead for receiving a periodically recurring information signal, a second input lead and an output lead, a pulse generator circuit receiving signals from the output lead of said adder circuit and delivering an ouput signal when its input signal exceeds a predetermined threshold value, and a delay line having an input lead receiving the output signals from said pulse generator circuit and an output lead delivering signals to the second input lead of said adder circuit, said delay line providing a signal delay totaling in combination with the delay provided by said pulse generator circuit an amount substantially equal to the period of recurrence of said information signal.

11. The means of claim 10 including a reference oscillator circuit delivering signals of a frequency equal to an integral multiple of the reciprocal of said period to said adder circuit for providing reference time-positions for signals circulating in said loop and biasing said signal toward said reference time-positions.

12. The means of claim 11 including a signal detector circuit having input leads receiving respective signals from said pulse generator circuit and said oscillator circuit and delivering output signals responsive to the time-positions of respective ones of said circulating signals with respect to their said reference time-positions.

13. The means of claim 12 including a pulse inserting network detecting the signals circulating in said signal loop and delivering a pulse to said signal loop to provide a circulating signal with respect to each of said reference time-positions.

14. A signal integrating means comprising a signal loop including an adder circuit having a first input lead for receiving an information signal, a second input lead and an output lead, a pulse generator circuit receiving signals from the output lead of said adder circuit and delivering an output signal when its input signal exceeds a predetermined threshold value, a delay line having an input lead receiving the output signals from said pulse generator circuit and an output lead delivering signals to the second input lead of said adder circuit, a reference oscillator circuit delivering signals to said outer circuit for providing reference time-positions for signals circulating in said loop and biasing said signals toward said reference time-positions, a signal detector circuit having input leads receiving respective signals from said pulse generator circuit and said oscillator circuit and delivering output signals responsive to the time-positions of respective ones of said circulating signals with respect to their said reference time-positions, and a pulse inserting network including a fault detecting unit receiving signals from said pulse generator circuit and delivering an ouput signal in the absence of a signal from said pulse generator circuit with respect to a reference time-position, and a pulse inserting generator unit delivering a pulse to said signal loop for providing a circulating signal with respect to said reference time-position upon receipt of an output signal from said unit.

15. The means of claim 14 in which said signal detector circuit is a signal phase detector and said oscillator circuit provides a saw tooth signal to said adder circuit.

References Cited by the Examiner

UNITED STATES PATENTS

| | | | |
|---|---|---|---|
| 2,569,927 | 10/1951 | Gloess et al. | 340—347 |
| 2,736,021 | 2/1956 | Sunstein | 328—127 |
| 2,800,580 | 7/1957 | Davies | 328—56 |
| 2,830,179 | 4/1958 | Stenning | 328—56 |
| 2,877,416 | 3/1959 | Grisdale | 328—133 |
| 2,924,706 | 2/1960 | Sassler | 328—133 |
| 2,935,609 | 5/1960 | Rabin et al. | 328—62 |
| 2,979,712 | 4/1961 | Lair | 343—7.3 |

JOHN W. HUCKERT, *Primary Examiner.*

GEORGE N. WESTBY, *Examiner.*

J. D. CRAIG, *Assistant Examiner.*